United States Patent
Schneider et al.

(10) Patent No.: US 7,129,477 B2
(45) Date of Patent: *Oct. 31, 2006

(54) METHOD OF PROCESSING DATA FROM A DUAL DETECTOR LWD DENSITY LOGGING INSTRUMENT COUPLED WITH AN ACOUSTIC STANDOFF MEASUREMENT

(75) Inventors: David M. Schneider, Spring, TX (US); Sergey V. Efremov, Houston, TX (US); Matthew J. Sale, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 290 days.

This patent is subject to a terminal disclaimer.

(21) Appl. No.: 10/400,402

(22) Filed: Mar. 27, 2003

(65) Prior Publication Data

US 2004/0021066 A1 Feb. 5, 2004

Related U.S. Application Data

(60) Provisional application No. 60/369,758, filed on Apr. 3, 2002.

(51) Int. Cl.
*G01V 5/14* (2006.01)

(52) U.S. Cl. .................. 250/266; 250/264

(58) Field of Classification Search ........ 250/266, 250/264, 265, 269.3, 269.1, 269.2, 269.7; 73/152.02, 152.03; 702/9
See application file for complete search history.

(56) References Cited

U.S. PATENT DOCUMENTS

| 5,397,893 | A   |   | 3/1995  | Minette ............... 250/254 |
|-----------|-----|---|---------|--------------------------------|
| 5,473,158 | A   | * | 12/1995 | Holenka et al. ...... 250/254   |
| 5,486,695 | A   | * | 1/1996  | Schultz et al. ...... 250/261   |
| 5,513,528 | A   |   | 5/1996  | Holenka et al. ...... 73/151    |
| 5,539,225 | A   |   | 7/1996  | Loomis et al. ....... 250/269.4 |
| 5,767,510 | A   | * | 6/1998  | Evans ............... 250/269.1 |
| 6,584,837 | B1  | * | 7/2003  | Kurkoski ............ 73/152.02 |
| 6,590,202 | B1  | * | 7/2003  | Mickael ............. 250/269.2 |
| 6,700,115 | B1  | * | 3/2004  | Mickael ............. 250/269.3 |

\* cited by examiner

*Primary Examiner*—Otilia Gabor
(74) *Attorney, Agent, or Firm*—Madan, Mossman & Sriram, P.C.

(57) ABSTRACT

A logging-while-drilling density sensor includes a gamma ray source and at least two NaI detectors spaced apart from the source for determining measurements indicative of the formation density. An acoustic caliper is used for making standoff measurements of the NaI detectors. Measurements made by the detectors are partitioned into standoff bins. An adaptive spine and rib method uses the standoff measurements to obtain density estimates. The method of the invention may also be used with neutron porosity logging devices.

14 Claims, 4 Drawing Sheets

METHOD OF PROCESSING DATA FROM A DUAL DETECTOR LWD DENSITY LOGGING INSTRUMENT COUPLED WITH AN ACOUSTIC STANDOFF MEASUREMENT

CROSS-REFERENCES TO RELATED APPLICATIONS

This application claims priority from U.S. Provisional Patent Application Ser. No. 60/369,758 filed on Apr. 3, 2002.

BACKGROUND OF THE INVENTION

1. Field of the Invention

This invention relates generally to borehole logging apparatus and methods for performing nuclear radiation based measurements. More particularly, this invention relates to a new and improved apparatus for effecting formation density logging in real time using gamma rays in a measurement-while-drilling (MWD) tool.

2. Background of the Art

Oil well logging has been known for many years and provides an oil and gas well driller with information about the particular earth formation being drilled. In conventional oil well logging, after a well has been drilled, a probe known as a sonde is lowered into the borehole and used to determine some characteristic of the formations which the well has traversed. The probe is typically a hermetically sealed steel cylinder which hangs at the end of a long cable which gives mechanical support to the sonde and provides power to the instrumentation inside the sonde. The cable also provides communication channels for sending information up to the surface. It thus becomes possible to measure some parameter of the earth's formations as a function of depth, that is, while the sonde is being pulled uphole. Such "wireline" measurements are normally done in real time (however, these measurements are taken long after the actual drilling has taken place).

A wireline sonde usually transmits energy into the formation as well as a suitable receiver for detecting the same energy returning from the formation. These could include resistivity, acoustic, or nuclear measurements. The present invention is discussed with reference to a density measurement tool that emits nuclear energy, and more particularly gamma rays, but the method of the present invention is applicable to other types of logging instruments as well. Wireline gamma ray density probes are well known and comprise devices incorporating a gamma ray source and a gamma ray detector, shielded from each other to prevent counting of radiation emitted directly from the source. During operation of the probe, gamma rays (or photons) emitted from the source enter the formation to be studied, and interact with the atomic electrons of the material of the formation by photoelectric absorption, by Compton scattering, or by pair production. In photoelectric absorption and pair production phenomena, the particular photons involved in the interacting are removed from the gamma ray beam.

In the Compton scattering process, the involved photon loses some of its energy while changing its original direction of travel, the loss being a function of the scattering angle. Some of the photons emitted from the source into the sample are accordingly scattered toward the detector. Many of these never reach the detector, since their direction is changed by a second Compton scattering, or they are absorbed by the photoelectric absorption process of the pair production process. The scattered photons that reach the detector and interact with it are counted by the electronic equipment associated with the detector.

Examples of prior art wireline density devices are disclosed in U.S. Pat. Nos. 3,202,822; 3,321,625; 3,846,631; 3,858,037, 3,864,569 and 4,628,202. Wireline formation evaluation tools such as the aforementioned gamma ray density tools have many drawbacks and disadvantages including loss of drilling time, the expense and delay involved in tripping the drillstring so as to enable the wireline to be lowered into the borehole and both the build up of a substantial mud cake and invasion of the formation by the drilling fluids during the time period between drilling and taking measurements. An improvement over these prior art techniques is the art of measurement-while-drilling (MWD) in which many of the characteristics of the formation are determined substantially contemporaneously with the drilling of the borehole.

Measurement-while-drilling logging either partly or totally eliminates the necessity of interrupting the drilling operation to remove the drillstring from the hole in order to make the necessary measurements by wireline techniques. In addition to the ability to log the characteristics of the formation through which the drill bit is passing, this information on a real time basis provides substantial safety advantages for the drilling operation.

One potential problem with MWD logging tools is that the measurements are typically made while the tool is rotating. Since the measurements are made shortly after the drillbit has drilled the borehole, washouts are less of a problem than in wireline logging. Nevertheless, there can be some variations in the spacing between the logging tool and the borehole wall ("standoff") with azimuth. Nuclear measurements are particularly degraded by large standoffs due to the scattering produced by borehole fluids between the tool and the formation.

U.S. Pat. No. 5,397,893 to Minette, the contents of which are fully incorporated herein be reference, teaches a method for analyzing data from a measurement-while-drilling (MWD) formation evaluation logging tool which compensates for rotation of the logging tool (along with the rest of the drillstring) during measurement periods. The density measurement is combined with the measurement from a borehole caliper, preferably an acoustic caliper. The acoustic caliper continuously measures the standoff as the tool is rotating around the borehole. If the caliper is aligned with the density source and detectors, this gives a determination of the standoff in front of the detectors at any given time. This information is used to separate the density data into a number of bins based on the amount of standoff. After a pre-set time interval, the density measurement can then be made. The first step in this process is for short space (SS) and long space (LS) densities to be calculated from the data in each bin. Then, these density measurements are combined in a manner that minimizes the total error in the density calculation. This correction is applied using the "spine and rib" algorithm and graphs such as that shown in FIG. 1. In the figure, the abscissa 1 is the difference between the LS and SS densities while the ordinate 3 is the correction that is applied to the LS density to give a corrected density using the curve 5.

U.S. Pat. No. 5,513,528 to Holenka et al teaches a method and apparatus for measuring formation characteristics as a function of azimuth about the borehole. The measurement apparatus includes a logging while drilling tool which turns in the borehole while drilling. The down vector of the tool is derived first by determining an angle φ between a vector to the earth's north magnetic pole, as referenced to the cross sectional plane of a measuring while drilling (MWD) tool and a gravity down vector as referenced in said plane. The logging while drilling (LWD) tool includes magnetometers and accelerometers placed orthogonally in a cross-sectional plane. Using the magnetometers and/or accelerometer measurements, the toolface angle can usually be determined. The angle $\phi$ is transmitted to the logging while drilling tool thereby allowing a continuous determination of the gravity down position in the logging while drilling tool. Quadrants, that is, angular distance segments, are measured from the down vector. Referring to FIG. 2, an assumption is made that the down vector defines a situation in which the standoff is at a minimum, allowing for a good spine and rib correction. A drawback of the Holenka method is that the assumption of minimum standoff is not necessarily satisfied, so that the down position may in fact correspond to a significant standoff: without a standoff correction and the results may be erroneous.

In a centralized or stabilized tool, the standoff will generally be uniform with azimuth. Holenka (U.S. Pat. No. 5,513,528) and Edwards (U.S. Pat. No. 6,307,199) also show how azimuthal measurements of density may be diagnostic of bed boundaries intersected by an inclined borehole. In the absence of standoff corrections, this can only be a qualitative measurement and the absolute density measurements may be suspect.

U.S. patent application Ser. No. 10/004,650 of Kurkoski, now U.S. Pat. No. 6,584,837 having the same assignee and the contents of which are incorporated herein by reference, teaches the use of a dual detector density logging tool with a standoff measuring device end a magnetometer for obtaining an azimuthal density image of a borehole. The standoff measurements are used for correcting the density measurements using the well known spine and rib correction method.

The spine and rib correction method used in Kurkoski and in other prior art methods as illustrated in FIG. 1 determines by empirical methods a correction to the density measurement made by the long spaced detector (LS) using the difference between the LS and the short spaced detector SS measurements. Implicit in such prior art methods is the assumption that the spine and rib is uniquely determined by a single correction. The spine and rib is usually determined under laboratory conditions with the tool immersed in water. In reality, there is more than one spine and rib relation and the actual correction to be applied depends upon numerous factors including the standoff and the composition of the mud. As would be known to those versed in the art, drilling mud includes minerals such as Barite that have a significant gamma ray scattering. As a result of this, it is commonly found that even after applying a single spine and rib correction, there is a significant variation in corrected density measurements with standoff.

Accordingly, there is a need for a method of processing dual detector density logging data that properly corrects for the standoff variations encountered in an MWD logging tool. The present invention satisfies this need.

SUMMARY OF THE INVENTION

The present invention includes a logging-while-drilling method of determining azimuthal variations of density in a borehole. A logging tool is conveyed on a drill collar includes a long spaced (LS) and a short spaced (SS) nuclear sensor. Measurements are made using the nuclear sensors on the logging tool over a time interval while rotating the tool with the drill collar. Standoffs corresponding to each of said LS and SS measurements are determined. A plurality of standoff bins is defined using measurements made by a standoff measuring device. A processor is used for determining from the LS and SS measurements a corrected density that compensates for the standoff effects.

In a preferred embodiment of the invention, the standoff measurements are made using an acoustic caliper. Within each standoff bin, a compensated density is determined using the LS and SS measurements and the associated standoff. In a preferred embodiment of the invention, the standoff corrections are applied using a regression technique.

In an optional embodiment of the invention, the MWD tool is also provided with a magnetometer or other direction sensitive device. When such directional measurements are made, each of the standoff bins are further subdivided into azimuthal bins defining an azimuthal sector around the tool. Compensated density determinations within an azimuthal sector are combined to give an azimuthal bulk density measurement. This difference may be used for controlling the drilling direction or as an indicator of proximity to a nearby interface.

BRIEF DESCRIPTION OF THE FIGURES

For detailed understanding of the present invention, references should be made to the following detailed description of the preferred embodiment, taken in conjunction with the accompanying drawings, in which like elements have been given like numerals and wherein:

FIG. 4b shows the distribution of standoff bins generated by the exemplary tool of FIG. 4a.

DETAILED DESCRIPTION OF THE INVENTION

Figure 3:
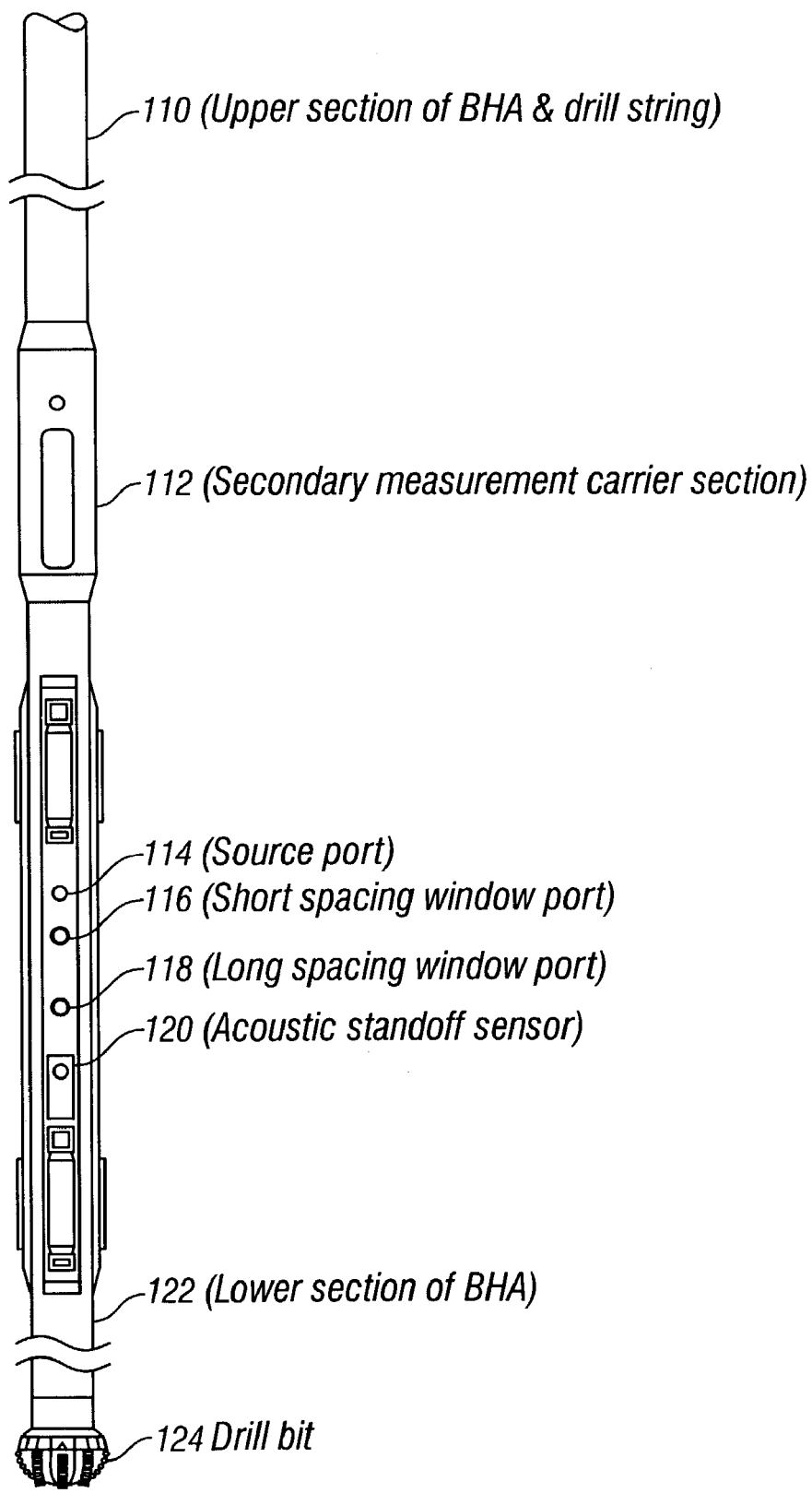
FIG. 3 illustrates the arrangement of the nuclear sensors on a logging-while-drilling device.

Referring now to FIG. 3 a diagram of the basic components for an exemplary gamma-ray density tool. This tool comprises an upper section of a bottom hole assembly including a drill collar 110. The logging tool of the present invention contains a gamma-ray source 114 and two spaced gamma-ray detector assemblies 116 and 118. All three components are placed along a single axis that has been located parallel to the axis of the tool. The detector 116 closest to the gamma-ray source will be referred to as the "short space detector" and the one farthest away 118 is referred to as the "long space detector". Gamma-ray shielding (not shown) is located between detector assemblies 116, 118 and source 114. Windows (ports) open up to the formation from both the detector assemblies and the source. The acoustic caliper (A1) 120 is inline and close to the gamma detectors (LS & SS). A layer of drilling fluid (mud) is present between the formation and the detector assemblies and source. Also shown in FIG. 3 are the lower section of the bottomhole assembly 122 and drill bit 124 and one or more additional sensor assemblies 112.

Figure 4A:
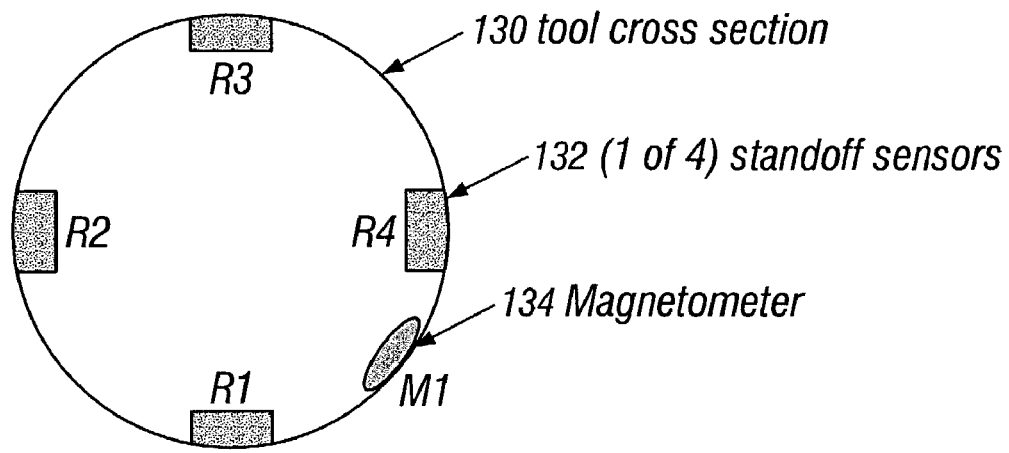
FIG. 4a shows an exemplary configuration of calipers and magnetometer on a downhole logging tool.

FIG. 4a illustrates cross section of a preferred acoustic caliper device. Four sensors R1, R2, R3 and R4 are shown circumferentially disposed around the drill collar with an azimuthal separation of 90°. Each sensor uses acoustic measurements to determine a travel time to the closest point on the borehole. For such a caliper, a commonly output measurement in well logging is the quantity $$S_1 = \frac{2 \cdot (x_1 + x_2 + x_3 + x_4)}{4} + T \quad (1)$$

$$S_{x\text{-}axis} = \frac{2 \cdot (x_1 + x_3)}{2} + T$$

$$S_{y\text{-}axis} = \frac{2 \cdot (x_2 + x_3)}{2} + T$$

where the $x_i$'s are standoff measurements made by the calipers R1, R2, R3 and R4 respectively, T is drill collar (tool) diameter, $S_1$ is a simple caliper, $S_{x\text{-}axis}$ is a simple caliper in the x axis, $S_{y\text{-}axis}$ is a simple caliper in the y axis. The acoustic sensor R1 is in the same azimuthal position as are the gamma ray detector assemblies shown in FIG. 3.

Figure 4B:
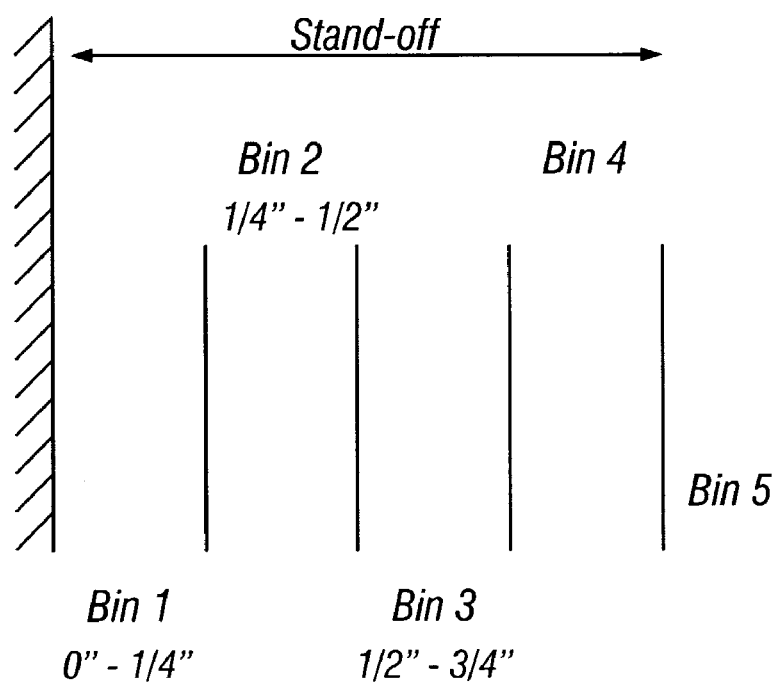
Figure 5:
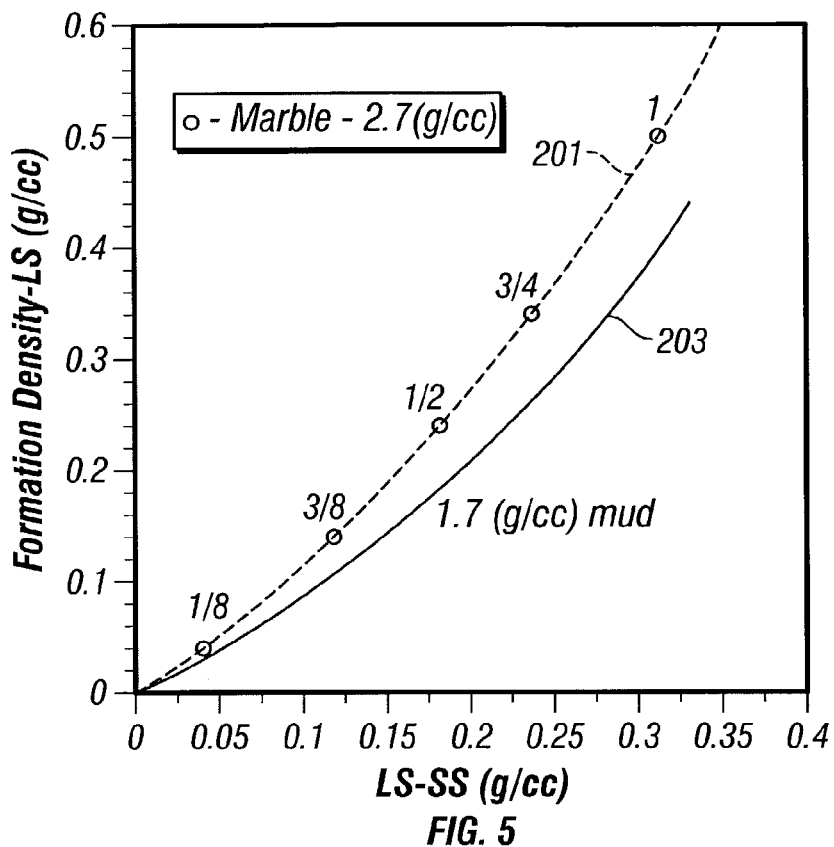
FIG. 5 shows an example of how the method of the present invention gives results comparable to those obtained subsequently using a wireline logging tool in the same borehole.

In an alternate embodiment of the present invention, the sensor arrangement includes a magnetometer 134 as shown in FIG. 4a. Magnetometer M1 makes measurements of the direction of the earth's magnetic field. Except for the rare case wherein the borehole is being drilled along the direction of the earth's magnetic field, the magnetometer output in conjunction with borehole survey information can be used to determine the relative orientation of the sensor R1 to the vertical. In such a case, the standoff bins shown in FIG. 4b may be further subdivided into azimuthal and sectors (not shown). Details of borehole surveying methods would be known to those versed in the art and are not discussed here.

Counts from each NaI (gamma) detector are binned by tool stand-off. As noted above, this method of binning combined with a traditional (single) spine and rib technique provides a measurement in larger boreholes that is better than one that does not use a standoff measurements. Binning compensates for BHA whirl and enlarged hole. The success of the technique depends on having a good detector count rate.

Those versed in the art would recognize that a gamma ray device produces accurate measurements only in a statistical sense and that simply by binning (and optionally further subdividing the measurements by azimuth), the statistics may be unreliable if the count within each region is too small. In order to get a reasonably large number of "counts", the present invention includes a gamma ray detector that is larger than prior art detectors. Also detector spacing, shielding, and collimation are selected to maximize response accuracy and minimize statistical effects. This increases the number of counts within each standoff bin and within each azimuthal range.

In a preferred embodiment of the invention, an acquisition period typically lasting at least 10 seconds is defined. It is to be noted that shorter periods may be used at the risk of getting poorer statistics. Within the acquisition period, depending upon the severity of the eccentric motion of the tool, data may be obtained in up to all 5 standoff bins. If 4 or 5 bins are populated in the acquisition period, it is possible to solve an optimization problem using a three parameter fit for the density $\rho_k$ as $$\rho_k = A + B \cdot h_k + C \cdot h_k^2 \quad (2)$$

where A is the first density estimate at zero standoff, $h_k$ is the standoff and B and C are fitting parameters. It is to be noted that instead of a quadratic fit of the form given by eq. (2), other types of fitting may also be used.

In a preferred embodiment of the invention, the optimization is done by minimizing the objective function $$J = \chi^2 = \sum_{k=1}^{N} (A + B \cdot h_k + C \cdot h_k^2 - \rho_k)^2 / \sigma_k^2. \quad (3)$$

This minimization is done by solution of the linear equations $$\frac{\partial J}{\partial A} = 0, \ \frac{\partial J}{\partial B} = 0, \ \frac{\partial J}{\partial C} = 0. \quad (4)$$

In eq. (3), N is the total number of bins populated by data in a particular acquisition. There should preferably be at least three bins of data in order to solve the system of three linear equations. This gives an estimate of the three parameters with statistical errors. It is to be noted that the estimate of parameter A correlates with the estimates of parameters B and C, since $$\frac{\partial^2 J}{\partial A \partial B} \neq 0 \text{ and } \frac{\partial^2 J}{\partial A \partial C} \neq 0. \quad (5)$$

Consequently, any statistical error in B or C will propagate into the estimate of A.

In a preferred embodiment of the invention, measures are taken to reduce the statistical errors (variances) in B and C. The parameter A is not used for the final estimate of formation density. Once the variances for B and C have been reduced, new parameters B' and C' are used to obtain formation density based on the data from different standoff bins:

$$\rho_{final} = \left( \sum_{k=1}^{N} \frac{1}{\sigma_k^2} \right)^{-1} \sum_{k=1}^{N} (\rho_k - B' \cdot h_k - C' \cdot h_k^2) / \sigma_k^2 \quad (6)$$

while the raw density measurement is given by $$\rho_{raw} = \left( \sum_{k=1}^{N} \frac{1}{\sigma_k^2} \right)^{-1} \sum_{k=1}^{N} \frac{\rho_k}{\sigma_k^2}. \quad (7)$$

Figure 1:
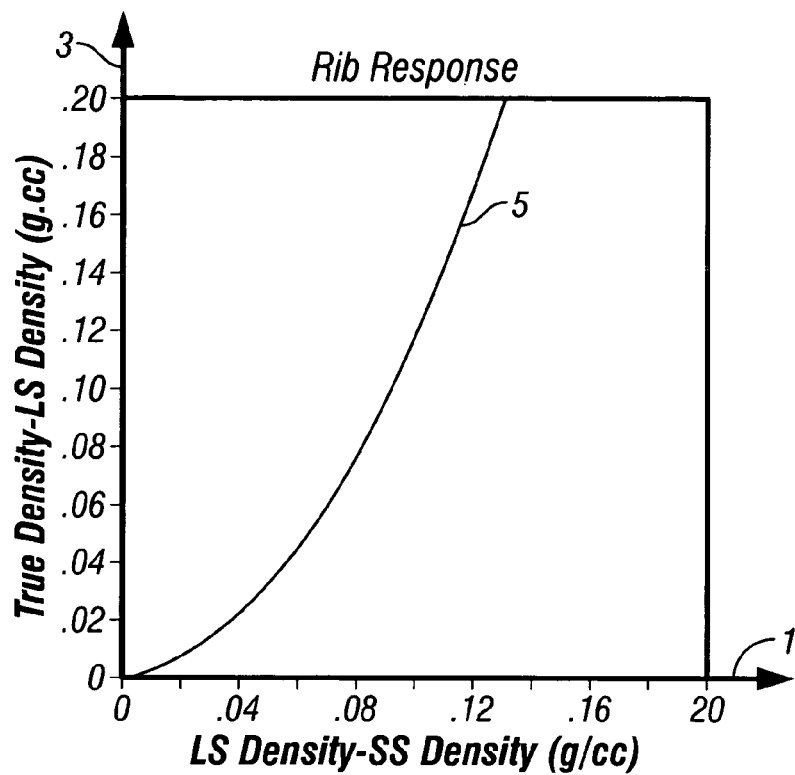
FIG. 1 (PRIOR ART) shows an example of how density measurements made from a long spaced and a short spaced tool are combined to give a corrected density.
Figure 2:
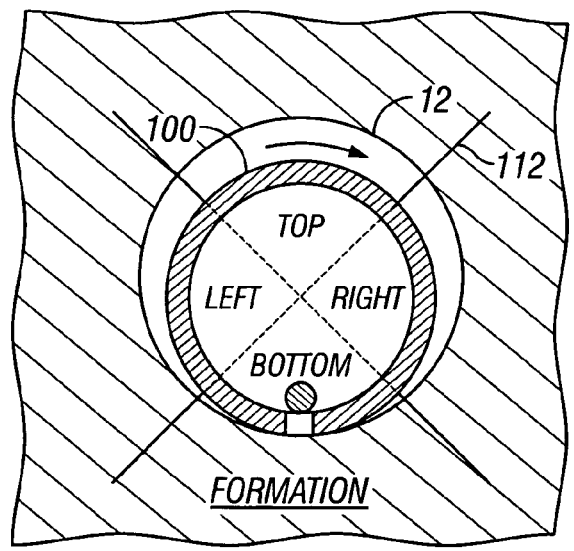
FIG. 2 (PRIOR ART) shows an idealized situation in which a rotating tool in a wellbore has a minimum standoff when the tool is at the bottom of the wellbore.

The measurements may suffer from a systematic shift due to main rib under- or over-compensation for the effect of drilling fluid. It can be shown that the above weighting scheme minimizes the variance of $\rho_{final}$ and $\rho_{raw}$. The eqn. (7) averages the measurements in different standoff bins compensated by a common rib. The eqn. (6) averages the measurements in different standoff bins compensated by an adaptive rib. In the present invention, the adaptive rib is obtained by using a common rib defined by the curves such as that shown in FIG. 1 plus a second order compensation using B' and C' and is given by $$\Delta \rho = f(\rho_{LS} - \rho_{SS}) - B'h_k - C'h_k^2 \qquad (8)$$

In order to reduce the variances of B and C in eq. (3), an assumption is made of a linear relationship between the formation density $\rho_f$ and the parameters B and C. Thus, $$B = b_0 + b_1 \cdot \rho_f$$

and $$C = c_0 + c_1 \rho_f \qquad (9)$$

The slope and intercept of these linear dependencies are defined by the properties of mud (mud density and photoelectric cross section), which slowly vary with depth. The parameters $b_0$, $b_1$, $c_0$, and $c_1$ are quasi-invariant. Therefore a strong filter can be applied to the raw estimates of these parameters. The initial approximations for these parameters are zeros. A first acquisition with sufficient number of standoff bins populated is used to obtain a raw estimate of parameters A, B and C. These parameters are then fed to filters for $b_0$, $b_1$, $c_0$, and $c_1$. Outputs of the filtered values of $b_0$, $b_1$, $c_0$, and $c_1$, together with the raw estimate of formation density, A, are then used to update parameters B and C to obtain B' and C'. In turn, B' and C' are used to get an initial estimate $_{final}$ of the density using eq. (7). Then the procedure is repeated now using $\rho_{final}$ instead of A in eq. (7) and the second estimate of $\rho_{final}$ is obtained. The filtering operation is discussed next.

In order to find both slope and intercept for a linear dependency, it is necessary have at least two measurements of parameters B and $\rho_f$ for different formation densities. But since both measurements B and $\rho_f$ have large statistical errors, two measurements are not sufficient to find $b_0$ and $b_1$ with high statistical precision. In a preferred embodiment of the invention, many measurements for B and $\rho_f$, are used to obtain the parameters $b_0$ and $b_1$ by solving the system of linear equations:

$$\begin{bmatrix} \left\langle \frac{1}{\text{var}(B)} \right\rangle & \left\langle \frac{\langle A \rangle}{\text{var}(B)} \right\rangle \\ \left\langle \frac{\langle A \rangle}{\text{var}(B)} \right\rangle & \left\langle \frac{\langle A^2 \rangle}{\text{var}(B)} \right\rangle \end{bmatrix} \cdot \begin{bmatrix} b_0 \\ b_1 \end{bmatrix} = \begin{bmatrix} \left\langle \frac{\langle B \rangle}{\text{var}(B)} \right\rangle \\ \left\langle \frac{\langle A \cdot B \rangle}{\text{var}(B)} \right\rangle \end{bmatrix} \qquad (10)$$

where the symbol < > denotes an averaging process. In a preferred embodiment of the invention, instead of simple average over all the points an exponential moving average with a weighting factor α is used. Such an average weights a new data point with a factor of α<<1 and the previous average with a weight of (1−α). This type of average gives greater weight to the latter points in the series and less weight to the earlier data points. This type of averaging may be expressed as follows:

$$<x>_k = \alpha x_k + (1-\alpha) <x>_{k-1} \qquad (11).$$

By employing an exponential moving average, the present invention uses data from a small section of the bore-hole preceding the current point were we evaluate parameters $b_0, b_1$ and estimate formation density. After calculating raw values for parameters $b_0, b_1$ another exponential moving average is taken with a different exponential weighting factor of β. In such an approach both parameters $b_0, b_1$ start with zero and then slowly converge to the true values as more data is acquired. Analogously we calculate and filter $c_0$, $c_1$. Parameters and α and β have to be chosen so that statistical error in $\sigma_{final}$ due to statistical errors in parameters B and C is much less than the statistical error of the raw density measurement.

The statistical error $\sigma_{raw} = \sqrt{\text{var}(\rho_{raw})}$ of the raw density measurement is a function of the variances of the density measurements in individual standoff bins, given by $$\sigma_k = \sqrt{\text{var}(\rho_k)} = \sqrt{\text{var}(\rho_{LS,k}) \cdot (1 + \partial f / \partial x)^2 + \text{var}(\rho_{SS,k}) \cdot (\partial f / \partial x)^2} \qquad (12)$$

where $x = \rho_{LS} - \rho_{SS}$ and $\partial f/\partial x$ is the slope of the common rib as used in eq.(8) above. The variance of the raw density measurement $\rho_{raw}$ is given by $$\sigma_{raw} = \left( \sum_k \frac{1}{\sigma_k^2} \right)^{-1} \qquad (13)$$

The standard deviations of the SS detector for bin k is given by $$\sigma_{SS,k} = \sqrt{\text{var}(\rho_{SS,k})} = \frac{1}{A_S \sqrt{N_{SS,k}}} \qquad (14)$$

where $N_{SS,k}$ is the number of counts in bin k for the SS detector. The count rate for bin k of the SS detector is given by $n_{SS,k} = N_{SS,k}/T_k$ where $T_k$ is the time in bin k. The SS density is defined by $$ln(n_{SS,k}) = B_{SS} - A_{SS}\rho_{SS,k} \qquad (15).$$

Similar expressions exist for the long spaced bin. The statistical error of the final density measurements is given by $$\sigma_{final} = \sqrt{\sigma_{raw}^2 + \sum_k w_k^2 \cdot (\text{var}(B) \cdot h_k^2 + \text{var}(C) \cdot h_k^4)} \qquad (16)$$

where $w_k$ is the weight of the k-th bin in the final density measurements. When a sufficiently large amount of data have been acquired, $\sigma_{final}$ approaches $\sigma_{raw}$.

Parameters α and β have to be chosen small enough to ensure that sufficient acquisition time is spent while optimizing $b_0, b_1$, $c_0$ and $c_1$. In the beginning of LWD run, when there is little data available to estimate the correction coefficients for the common rib $b_0$, $b_1$, $c_0$ and $c_1$, the statistical noise will propagate to the final density estimate and will be comparable to the statistical noise of the raw density measurement. Once more data becomes available, this component of statistical noise vanishes, while the optimized density measurement becomes closer to zero standoff density.

Depending upon how the standoff varies with time, the present invention may be modified. Specifically, when only one bin populated neither B nor C can be evaluated. Consequently, the bin size is reduced so that data will fall into more than one bin. If all the data fall within the two bins with the smallest standoff, then only the parameter B is used in the adaptive method. If data fall into three bins with smallest standoff, both B and C can be estimated but the error in C will be large: hence a smaller weight is assigned to C, when it is used in the filter. If four bins of data are available with adequate statistics, then no modification needs to be made. Finally, if no data is available with the two smallest standoff bins, neither B nor C can be evaluated.

The method of the present invention has been described with reference to a gamma ray logging instrument used for determination of the formation density. The method is equally applicable for determining porosity of earth formations using a neutron source and two spaced apart detectors.

Figure 6:
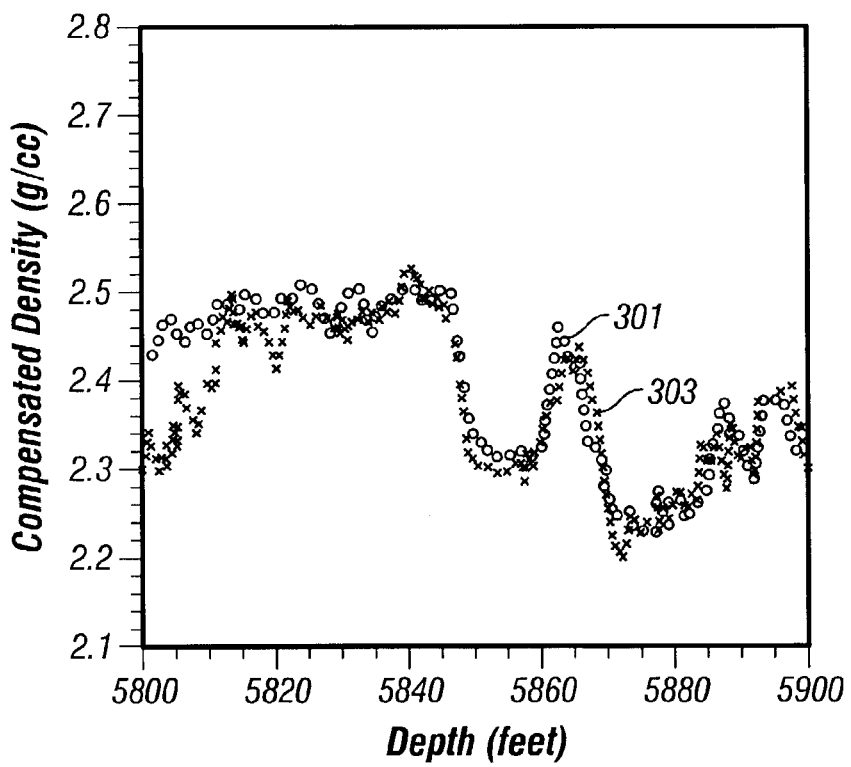
FIG. 6 shows results of using the method of the present invention.

Turning now to FIG. 6, the points denoted by 303 show actual field results using the method of the present invention in a MWD device as described above for determination of formation density. The points denoted by 301 show densities obtained subsequent to the drilling of the borehole with a wireline device, i.e., with substantially zero stand off. As can be seen, initially, the MWD measurements are different from the more accurate wireline measurements. However, after the adaptive method has had time to adapt, the MWD corrected measurements track the wireline measurements very closely.

While the foregoing disclosure is directed to the preferred embodiments of the invention, various modifications will be apparent to those skilled in the art. It is intended that all variations within the scope and spirit of the appended claims be embraced by the foregoing disclosure.

What is claimed is:

1. A method of logging of an earth formation comprising:
    (a) conveying a logging tool into a borehole in the earth formation and rotating the tool therein;
    (b) making a plurality of long spaced (LS) and short spaced (SS) measurements of a parameter of interest of the earth formation using nuclear sensors on the logging tool over a time interval during continuing rotation of the tool;
    (c) determining a standoff associated with each of said LS and SS measurements; and
    (d) using an adaptive spine and rib method for determining from said plurality of LS and SS measurements and their associated standoffs, an estimate of the parameter of interest;
    wherein the adaptive spine and rib method further comprises:
    (e) defining a plurality of standoff bins,
    (f) determining a first estimate of density at zero standoff, and
    (g) representing compensated density of each said standoff bin as a function of said first estimate and the standoffs of said plurality of standoff bins.

2. The method of claim 1 wherein determining said standoff further comprises using a caliper on the logging tool.

3. The method of claim 2 wherein said caliper is an acoustic caliper.

4. The method of claim 2 wherein said caliper comprises an acoustic sensor azimuthally aligned with said nuclear sensors.

5. The method of claim 1 wherein the parameter of interest comprises a bulk density of the earth formation.

6. The method of claim 1 wherein the parameter of interest comprises a porosity of the earth formation.

7. The method of claim 1 wherein said function is a polynomial function of said standoffs.

8. The method of claim 1 wherein determining said estimated bulk density comprises minimizing a statistic of error in said functional representation.

9. The method of claim 8 wherein said statistic of error is a Chi-squared ($\chi^2$) function.

10. The method of claim 8 wherein minimizing said statistic of error further comprises a filtering of parameters of said functional representation.

11. The method of claim 10 wherein said filtering is an exponential filtering.

12. The method of claim 1 wherein said first estimate is obtained using a common spine and rib.

13. An apparatus for logging while drilling of a borehole in an earth formation comprising:
    (a) a drill collar conveyed in the borehole;
    (b) at least two nuclear sensors carried by the drill collar which make measurements of a parameter of interest of the earth formation;
    (c) a caliper on the drill collar which measure a standoff of the at least two sensors relative to a wall of the borehole; and
    (d) a processor which uses
        (i) measurements made by the at least two nuclear sensors, and
        (ii) an adaptive spine and rib method,
        and determines therefrom an estimate of the parameter of interest corrected for standoff of the sensors;
    wherein the processor uses the adaptive spine and rib method by further:
    (e) defining a plurality of standoff bins,
    (f) determining a first estimate of density at zero standoff, and
    (g) representing a compensated density of each said standoff bin as a function of said first estimate and the standoffs of said plurality of standoff bins.

14. The apparatus of claim 13 wherein the at least two nuclear sensors are selected from the group consisting of (i) gamma ray detectors, and, (ii) neutron detectors.

* * * * *